(No Model.)
G. W. CROSS.
SCREEN.
No. 513,890. Patented Jan. 30, 1894.
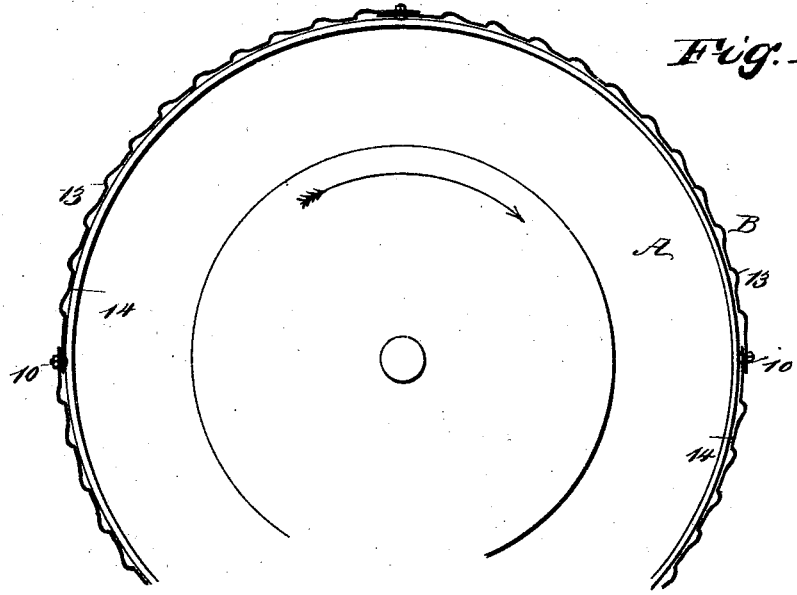
Fig. 1
Fig. 2
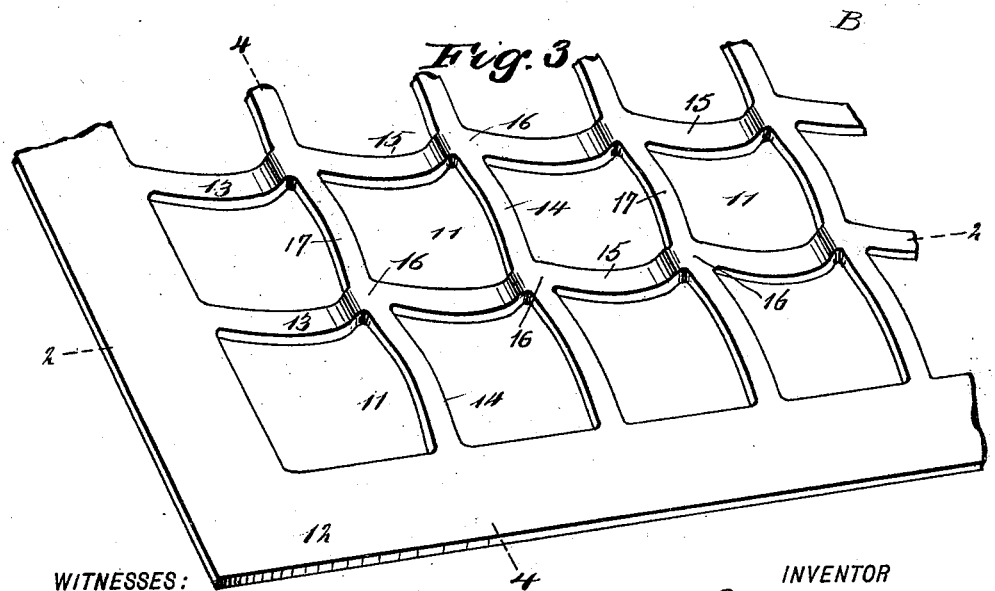
Fig. 3
Fig. 4
WITNESSES:
J. A. Bergstrom
C. Sedgwick
INVENTOR
G. W. Cross
BY
Munn & Co.
ATTORNEYS.

UNITED STATES PATENT OFFICE.

GEORGE W. CROSS, OF PITTSTON, PENNSYLVANIA.

SCREEN.

SPECIFICATION forming part of Letters Patent No. 513,890, dated January 30, 1894.

Application filed August 14, 1893. Serial No. 483,126. (No model.)

*To all whom it may concern:*

Be it known that I, GEORGE W. CROSS, of Pittston, in the county of Luzerne and State of Pennsylvania, have invented a new and useful Improvement in Screens, of which the following is a full, clear, and exact description.

My invention relates to an improvement in screens, especially to an improvement in the screening surfaces of coal screens, and the object of the invention is to provide a screening surface, which will cause the coal, or other lumpy contents of the screen to practically pause and turn at the meshes instead of sliding over them as heretofore, and thereby promote the operation of sizing the coal.

A further object of the invention is to construct the screening surface of a screen in segmental plates in which openings are produced corresponding to the meshes of wire screens.

The invention consists in the novel construction and arrangement of parts, as will be hereinafter fully set forth and pointed out in the claim.

Reference is to be had to the accompanying drawings forming a part of this specification, in which similar figures and letters of reference indicate corresponding parts in all the views.

Figure 1 is a partial transverse section through the body of a screen having the improved screening surface applied thereto. Fig. 2 is a transverse section through one of the screening plates, taken practically on the line 2—2 of Fig. 3. Fig. 3 is a partial perspective view of one of the screening plates; and Fig. 4 is a transverse section through a plate taken at right angles to the section shown in Fig. 2 and practically on the line 4—4 of Fig. 3.

In carrying out the invention a circular frame A, is illustrated as a support for the screen plates B, composing the screening surface of the screen. Any desired number of plates may be employed, and the plates extend from end to end of the screen, overlapping each other at their side edges, or the plates may be made to abut one against the other, and the plates are secured together by means of bolts 10, or their equivalents, which bolts are likewise made to enter the frame of the screen.

The main feature of the invention relates to the special construction of the segmental plates B. These plates are provided with a series of openings 11 produced in them, the openings being arranged in regular series extending from end to end and from side to side of the plates, a small solid margin 12 only being retained. The openings are separated by walls 13 and 14, the walls 14, being continuous and extending from end to end of a plate, or in direction of the ends of the screen frame, while the walls 13 cross the walls 14 and extend from side to side of the plate, or circumferentially of the frame. The walls 13, are of peculiar undulating form, as shown in the cross section in Fig. 2, their inner faces being concaved where the walls separate the openings 11, as shown at 15, and the said walls are flat where they intersect with or join the longitudinal walls 14, as is illustrated in both Figs. 2 and 3. The longitudinal walls 14 present alternate convexed surfaces 17 and concaved surfaces 16 upon their lower or inner faces, as shown in Fig. 4, the concavities occurring where the walls join the circumferential walls 13, while the convexities occur between the said walls 13. It is evident therefore, that in the construction of the complete plate two of the walls of each opening are concaved upon their working faces, and two of them are convexed.

When a screening surface is constructed as above set forth and the screen is revolved, and the coal, or whatever material in lump form that may be within the screen, is made to strike the convexed or bridge sections of the walls 14, by such contact the coal will be made to pause, turn, and if of proper size it will drop through the openings in the screen and not slide by the openings, as happens when the screening surface is simply a perforated one. In fact, with the metal screen plates above described, as satisfactory results may be obtained as when a woven wire screen is used, but the plate screen is of much greater durability than the wire screen, and much more economical.

Having thus described my invention, I claim as new and desire to secure by Letters Patent—

A screen, consisting essentially of a plate formed with perforations at intervals, the longitudinal walls of said perforations being convex and the transverse or circumferential walls being concave upon their working faces, substantially as set forth.

GEORGE W. CROSS.

Witnesses:
W. M. BERRY,
BEN P. CUTLER.